Inventor:
John J. Kowalik
By John W. Gaines
Atty.

United States Patent Office 3,451,494
Patented June 24, 1969

3,451,494
CLOSE-COUPLED ARTICULATED
CRAWLER TRACTOR
John J. Kowalik, Glenview, Ill., assignor to International
Harvester Company, Chicago, Ill., a corporation of
Delaware
Filed Oct. 6, 1967, Ser. No. 673,439
Int. Cl. B62d 55/06; E02f 3/76
U.S. Cl. 180—9.24    12 Claims

ABSTRACT OF THE DISCLOSURE

Wheel steered, all crawler tractor having front and rear frame sections articulated together at their adjacent ends. Each frame section carries longitudinal, crawler type endless tracks at opposite sides of the frame section, which tracks are laterally spaced apart from the frame and which, at the articulated end of the frame section, extend past the articulation so as to be non-interferingly intercalated with the tracks on the other section. Steering is accomplished by angulating the sections under power of steering cylinders located at the articulation, the cylinders responding to turning of a steering wheel in conventional way.

---

This invention relates to a close-coupled articulated crawler tractor. The tractor has articulately connected front and rear frame sections and qualifies as an all track type or all crawler type vehicle because each section carries endless crawler tracks disposed one at each side of the frame of the section.

Crawler vehicles are steered by driving according to the practice. The comparatively long and narrow floatation area of footprint supporting each crawler track, and its essentially 1.0 coefficient of friction with the ground provide ample justification for the dominance of crawlers in many industrial and farm vehicle applications. Steering-wheel-steering has not proved practical, and it is therefore the practice to tolerate both the complex multi-lever or multi-pedal steering system conventional in the designs, and the extensive lengths of both the vehicle and the floatation area of its tracks, which latter are nevertheless adaptable to turning under manual control above referred to as steering by driving. Not only is the so-called interface of the manual control, as presented to the operator, complex and expensive but also the various steering clutches, steering brakes, and the like are complex and expensive, particularly being expensive.

Figure 1:
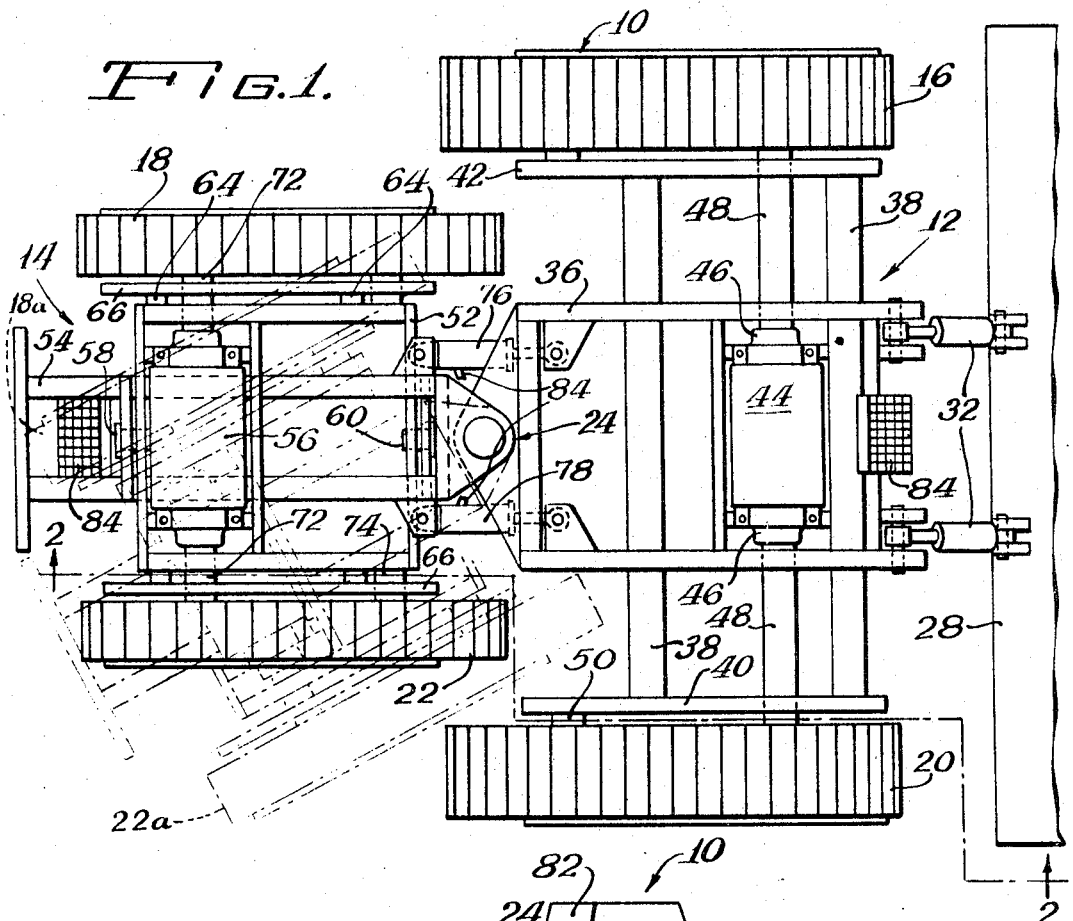
Figure 2:
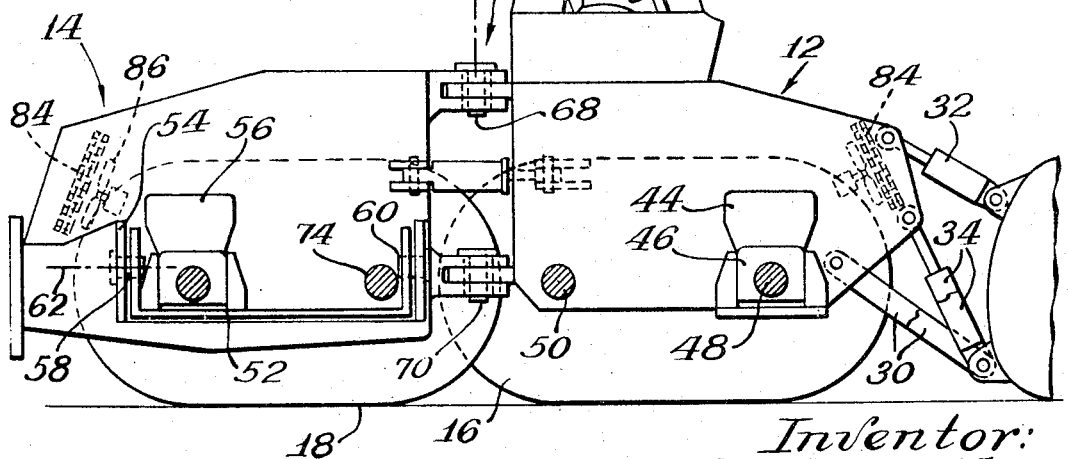

Objects of the present invention of a close-coupled, crawler adaptation of an articulated vehicle are to materially reduce if not substantially eliminate the foregoing complications with crawlers, and to provide a lengthwise compact and maneuverable crawler vehicle which will readily steer by means of articulated steering and in response to a conventional steering wheel, as will now be explained in detail. Features, objects, and advantages will either be specifically pointed out or become apparent when, for a better understanding of my invention, reference is made to the following description, taken in conjunction with the accompanying drawing which shows a preferred embodiment thereof and in which:

FIGURE 1 is a top plan view of an all crawler, articulated vehicle embodying the invention; and FIGURE 2 is a view in side elevation taken along the section lines 2—2 of FIGURE 1.

More particularly, an articulated crawler tractor 10 is shown in the drawing having first and second frame sections 12 and 14 which carry corresponding left endless chain type tracks 16 and 18 and corresponding right endless chain type tracks 20 and 22. At their adjacent ends, the frame sections 12 and 14 have an articulated connection 24 of a type having a single upright axis 26 of articulation, such axis defining, and being coincident with, the actual swing center of the connection.

The close-coupled configuration of the tractor vehicle 10 fore and aft adapts it especially for high maneuverability and for operations in particularly close quarters, as for work as a loader. For that work, the tractor 10 is equipped with a loader bucket 28 at the front end of the first section 12, the bucket 28 being interconnected therewith by the usual pairs of links such as the links 30, by tilt cylinders 32, and by lift cylinders 34. The vehicle 10 can move the bucket 28 into a load or can dump a load while in relatively tight confines, or while executing a sharp turn, or both.

It is important in the comparatively wide tracked vehicle 10 hereof that the tracks which are widest apart be those tracks 16 and 20 of the set of tracks on the first section 12. The first section 12 is the working end of the vehicle shown, and the greatest lateral stability of the vehicle is required adjacent the loader bucket 28.

Novelty is believed to reside in the readily steered and longitudinally compact configuration achieved with my invention. To that end, the suspension which is provided for the relatively narrow, generally rectangular main frame 36 of the first section 12 comprises a sub-frame having a comparatively wide extent due to the long reach of track-frame-connected lateral portions or outriggers of the two sub-frame cross members 38. A track frame 40 which carries the track 20 at the right side of the vehicle is fixed to the lateral portions of the cross members 38 at that side, and the sub-frame thus spans a working space non-interferingly receiving the front portion of the right track 22 of the rear section 14. A similar track frame 42 at the other side of the first section 12 provides the same spanning arrangement to receive the front portion of the left track 18 of the second section 14. Intercalation of the tracks of the respective sections in this manner results in substantially continuous ground contact for the length of the vehicle as evidenced by the track overlap shown in FIGURE 2.

The tractor 10 has a front engine 44 which is cross mounted on the main frame 36 of the first section, and which includes at each end a step-down reversible transmission and shaft brake box 46 at that end. Neither brake in the boxes 46 has a steering function, and generally the shaft brake is applied either to brake an associated sprocket drive axle 48 when the engine and transmission are driving forwardly, or to brake the axle 48 when the engine and transmission are driving rearwardly, or to brake the axle 48 during neutralization of the transmission, as when the engine is stopped or idling.

Each of the left and right tracks 16 and 20 of the first section is trained over an individual drive sprocket, not shown, which is rotated by the sprocket drive axle 48 and over a rear idler wheel, not shown, rotatably mounted on an idler axle 50.

Though they differ in one principal dimension, namely width, the sections 14 and 12 have identical propulsion and much the same design, and thus the second section 14 is characterized by a relatively wide span of a rear sub-frame 52 thereof compared to the main frame 54 of the second section 14.

One difference in the second section 14 resides in the reason for the span, which is to space apart the respective rear tracks 18 and 22 from the main frame 54, giving the vehicle 10 an overall wide track. It is necessary for the reason that the respective tracks 18 and 22 must clear the sides of the main frame 36 of the first section 12, particularly when turning. When turning to the right, the right track 22 of the vehicle takes the angled position as shown by the broken lines 22a, in which the intercalated front portion of the track approaches closely to the side of the main frame 36. The fact of the wide spans of the suspensions of the two sections, coupled with the fact that their suspensions are prolongated as evidenced by the distance between the fore and aft spaced apart drive and idler axles, accounts for substantial fore and aft and lateral stability of the sections 12 and 14 when articulately connected together. But equally significantly, each section is entirely self sustaining and propellable (by its independent engine, two tracks, and the separate drive coupling means to each track including a neutralizable step-down reversible transmission and shaft brake) when the sections are disconnected at the articulation.

A more important difference in the second section 14 is that a separate engine 56 carried thereby is cross mounted on the sub-frame 52, and the sub-frame is supported for rolling action by spaced apart, longitudinally aligned pivots 58 and 60 carried by the main frame 54 and defining a common central fore and aft axis 62. Outrigger or lateral portions of cross members 64 in the sub-frame are solidly interconnected with opposite track frames 66 provided for the respective left and right tracks 16 and 22 of the second section 14.

The articulated connection 24 is important in keeping the first and second sections 12 and 14 in a common plane parallel to the ground. The connection comprises a pair of vertically spaced apart, pin type hinges 68 and 70 which are aligned on the generally upright axis 26 and which interconnect the sections so as to perform that function. The central, fore and aft axis 62 when extended intersects the upright axis 26 at the point where the axis 62 passes through the lower pin type hinge 70.

It is important that the sub-frame 52 of the second section 14 have freedom in the lateral roll direction relative to the second section, in direct contrast to the sub-frame of the first section which is rigid with the main frame 36 of the first section. In that way, twisting or binding stresses in the articulated connection 24 are minimized both when the vehicle is straightaway and when angulated, and the collective tracks 16, 18, 20, and 22 are assured of simultaneous contact with the ground so that both the joint floatation area and joint traction tend to stay constant. Thus despite the compact length of the presen all crawler vehicle there is no loss of drawbar capability.

Articulation is important in the present all crawler tractor because it enables turns to be executed with each track at one side of the vehicle being driven at the same speed as its companion track on the opposite side. Thus a pair of oppositely extending sprocket drive axles 72 between a pair of rear sprockets, not shown, and the rear engine 56 run at equal speeds on the straightaway, and also run at equal speeds during turns, the inboard one of the tracks 18 and 22 driven by the sprockets being the track making slightly less distance good per revolution during a turn. The forward loop of each of the tracks 18 and 22 is trained over a front idler wheel, not shown, which rotates on an idler axle 74.

A pair of hydraulic steering cylinders 76 and 78 is disposed one at each side of the upright axis 26 and at a level intermediate the upper and lower pin type hinges 68 and 70. The cylinder at each side of the tractor 10 interconnects the sections at that side and, as a result of foreshortening one cylinder and extending the other simultaneously under power, the two sections angulate relative to the axis 26.

The two cylinders 76 and 78 and a steering wheel 80 in an operator's cab 82 form part of a hydraulic steering system 84 which interconnects them. In conventional way, when the wheel 80 takes an angular displacement from neutral to any fixed number of degrees, the cylinders 76 and 78 angularly force the sections from straightaway to some angle in fixed ratio to the steering wheel displacement. If the steering wheel 80 is restored to neutral, the frames straighten at the joint so as to be restored to the straightaway or neutral position.

The pistons on the ends of the steering piston rods internally bottom at a corresponding end or at both ends of the steering cylinders 76 and 78, providing stops to limit angulation between the sections to an ample value desired, e.g., 40° relative to the fore and aft or straightaway axis.

It is important to have steering-wheel-steering in the short-turning compact all crawler vehicle hereof, in lieu of prior steering systems for crawler vehicles employing one or more levers for controlling steering clutches, brakes, and other devices used heretofore. For convenience of the operator and more efficiency, the forward facing cab 82 is located forwardly of the upright axis 26, at a point as close to the axis as possible and accessible for close observation of a front-end mounted tool, such as the bucket 28.

The present articulated environment is important in a track type traction vehicle because two engines 44 and 56 can pe provided which effectively afford twice the lugging effort in cooperation with one another and which take full advantage of the substantially unbroken floatation area from front to rear of the present articulated tractor. In operation, the driver maintains the engines 44 and 56 at the same speed so that the right tracks 20 and 22, and similarly the left tracks 16 and 18, are run at approximately the same slow speed when inching the vehicle and at approximately the same intermediate or higher speeds when the vehicle is required to move faster. Nevertheless, each engine is separate in the sense that it has its own radiator 84, cooling fan 86, and pairs of boxes such as the boxes 46 containing the step-down reversible transmissions and shaft brakes.

What is claimed is:
1. An all crawler vehicle comprising:
first and second frame sections in end to end relationship having an articulated connection to one another to relatively pivot about the effective swing center of their connection;
each section having generally full length longitudinal crawler tracks at opposite sides, the tracks of at least one section projecting at one end past the effective swing center of the articulated connection at that end, and also being in non-interferingly intercalated transversely offset relation with the tracks of the other of the sections.

2. The invention of claim 1, characterized by a loader bucket on the vehicle connected to the wider tracked first section thereof.

3. The invention of claim 1, the tracks of the respective frame sections characterized by being arranged one at each side thereof and with a space between it and the frame section;
the tracks of the second section arranged so that a track at at least one side of the second section will be interposed noninterferingly in the space between the track at that side on the first section and the frame of the first section in all positions of angularity between the two sections.

4. The invention of claim 1, each section characterized by an independent source of tractive power carried thereby; and
means coupling the power source of the section to each of the tracks thereof to keep the latter constantly locked in the same speed and operating in the same direction to one another.

5. The invention of claim 4, characterized by a subframe on one frame section pivoted to the frame of the latter on a generally central fore and aft extenidng axis, and supporting the source, coupling means, and tracks in common.

6. The invention of claim 5, said articulated connection characterized by a generally upright single axis of articulation passing in substantially intersecting relation to said fore and aft extending axis.

7. The invention of claim 5, said articulated connection comprising vertically spaced apart pivot joints between the sections mutually defining a generally upright axis with which said swing center coincides;

said fore and aft extending axis, when extended, passing in substantially intersecting relation through the lower pivot joint.

8. The invention of claim 1, the articulated connection characterized by a generally upright single axis of articulation with which said swing center coincides.

9. The invention of claim 8, characterized by steering means comprising:

steering-wheel-controlled cylinders disposed one on each side of the axis of articulation and each interconnecting the sections at that side; and a steering wheel connected to the cylinders for controlling the angularity of the sections of said all crawler vehicle.

10. The invention of claim 9, further characterized by:

stop means at the articulated connection engageable to limit the amount of the angle by which the sections become relatively displaced from a straightaway position.

11. The invention of claim 8, characterized by:

a cab on one section solely supported thereon, and closely adjacent and facing away from the axis of articulation.

12. The invention of claim 11, each section of the all crawler vehicle characterized by a prolongated suspension including fore and aft spaced apart drive and idler axles with respect to which the driven endless tracks circulate in a surrounding relation, and further characterized by both fore and aft and lateral stability so that each section is entirely self sustaining and propellable when the sections are uncoupled at their articulated connection.

References Cited

UNITED STATES PATENTS

| | | | |
|---|---|---|---|
| 1,298,367 | 3/1919 | Macfie | 180—9.46 |
| 2,673,616 | 3/1954 | Moores | 180—51 |
| 2,933,143 | 4/1960 | Robinson | 180—14 |
| 3,334,702 | 8/1967 | Granryd | 180—51 |
| 3,349,863 | 10/1967 | Wagner | 180—51 |

FOREIGN PATENTS 593,303   2/1934   Germany.

RICHARD J. JOHNSON, *Primary Examiner.*

U.S. Cl. X.R.

37—117.5; 172—801; 180—9.44, 14, 51